United States Patent
Kim et al.

(10) Patent No.: US 11,920,827 B2
(45) Date of Patent: Mar. 5, 2024

(54) AIR CLEANER AND HOME APPLIANCE

(71) Applicant: Samsung Electronics Co., Ltd., Suwon-si (KR)

(72) Inventors: Mun Sub Kim, Suwon-si (KR); Jae-Woo Choi, Suwon-si (KR); Hyeong Joon Seo, Suwon-si (KR); Du Han Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 16/968,703

(22) PCT Filed: Oct. 18, 2018

(86) PCT No.: PCT/KR2018/012359
§ 371 (c)(1),
(2) Date: Aug. 10, 2020

(87) PCT Pub. No.: WO2019/160219
PCT Pub. Date: Aug. 22, 2019

(65) Prior Publication Data
US 2021/0010694 A1    Jan. 14, 2021

(30) Foreign Application Priority Data
Feb. 13, 2018   (KR) .................. 10-2018-0017643

(51) Int. Cl.
*F24F 8/10* (2021.01)
*F24F 8/80* (2021.01)
(Continued)

(52) U.S. Cl.
CPC .................. *F24F 8/10* (2021.01); *F24F 8/80* (2021.01); *F24F 13/24* (2013.01); *F24F 8/108* (2021.01); *H02K 5/24* (2013.01); *H02K 7/116* (2013.01)

(58) Field of Classification Search
CPC ............ F24F 13/24; F24F 8/108; H02K 5/24
See application file for complete search history.

(56) References Cited

U.S. PATENT DOCUMENTS

2018/0080457 A1*  3/2018  Kim ..................... F04D 29/329
2021/0010694 A1*  1/2021  Kim ......................... F24F 8/80

FOREIGN PATENT DOCUMENTS

JP      H11-14134 A      1/1999
KR      10-0474050 B1    3/2005
(Continued)

OTHER PUBLICATIONS

International Search Report and Written Opinion of the International Searching Authority in connection with International Application No. PCT/KR2018/012359 dated Feb. 19, 2019, 11 pages, Not in English.
(Continued)

*Primary Examiner* — Robert W Horn (57) ABSTRACT

The present disclosure relates to an air cleaner. The air cleaner includes a main body, a panel configured to be movable with respect to the main body, a power transmission device connected to the panel, a vibration-preventing member connected to the power transmission device and including a vibration-preventing portion in contact with the power transmission device and a slip-preventing portion having a thickness thinner than the vibration-preventing portion, and a driving source connected to the vibration-preventing member.

13 Claims, 11 Drawing Sheets

(51) Int. Cl.
*F24F 13/24* (2006.01)
*F24F 8/108* (2021.01)
*H02K 5/24* (2006.01)
*H02K 7/116* (2006.01)

(56) References Cited

FOREIGN PATENT DOCUMENTS

| KR | 10-0495542 B1 | 6/2005 |
| KR | 10-2005-0110233 A | 11/2005 |
| KR | 10-1533561 B1 | 7/2015 |
| KR | 10-2015-0102674 A | 9/2015 |

OTHER PUBLICATIONS

Notice of Preliminary Rejection dated Nov. 21, 2022 in connection with Korean Patent Application No. 10-2018-0017643, 10 pages.

* cited by examiner

AIR CLEANER AND HOME APPLIANCE

CROSS-REFERENCE TO RELATED APPLICATIONS

This application is a 371 National Stage of International Application No. PCT/KR2018/012359, filed Oct. 18, 2018, which claims priority to Korean Patent Application No. 10-2018-0017643, filed Feb. 13, 2018, the disclosures of which are herein incorporated by reference in their entirety.

BACKGROUND

1. Field

The present disclosure relates to an air cleaner and a home appliance, and more particularly, to an air cleaner and a home appliance that have a movable panel.

2. Description of Related Art

An air cleaner is a device used to remove contaminants contained in air. The air cleaner may remove bacteria, viruses, mold, and fine dust that exist in the inhaled air, and chemical substances that cause odors.

The air cleaner may include a filter for purifying contaminated indoor air. As the air sucked into the air cleaner passes through the filter, contaminants in the air may be removed and purified air may be discharged to the outside of the air cleaner.

The air cleaner may be configured such a size of a discharge port may be increased by a panel to increase space utilization. To this end, the panel may be provided to be movable in a main body. To this end, the air cleaner may include a driving device for moving the panel. Typically, the driving device may include a driving source for generating power and a gear assembly for transmitting power generated by the driving source to the panel.

When the driving source drives to open the panel, vibration may occur, and this vibration may be transmitted to the panel through the gear assembly to generate noise.

SUMMARY

The present disclosure is directed to providing an air cleaner and a home appliance capable of reducing noise generated by vibration occurring in a driving source for driving a panel.

The present disclosure is directed to providing an air cleaner and a home appliance capable of preventing a vibration-preventing member for reducing vibration from slipping and running idle with respect to the gear assembly.

One aspect of the present disclosure provides an air cleaner including a main body, a panel configured to be movable with respect to the main body, a power transmission device connected to the panel, a vibration-preventing member connected to the power transmission device and including a vibration-preventing portion in contact with the power transmission device and a slip-preventing portion having a thickness thinner than the vibration-preventing portion, and a driving source connected to the vibration-preventing member.

The slip-preventing portion may be disposed to form a gap with the power transmission device.

The power transmission device may include an insertion hollow into which the vibration-preventing member is inserted, and a first portion of the insertion hollow into which the slip-preventing portion is inserted may be configured to interfere with rotation of the slip-preventing portion.

The slip-preventing portion may be configured to have a polygonal shaped cross section, and the first portion of the insertion hollow may be formed in a shape corresponding to the slip-preventing portion.

The first portion of the insertion hollow may be configured to have a size larger than the slip-preventing portion.

A second portion of the insertion hollow into which the vibration-preventing portion is inserted may be configured to correspond to a size and shape of the vibration-preventing portion.

The driving source may include a connection shaft connected to the vibration-preventing member, an insertion portion of the connection shaft inserted into the vibration-preventing member may be configured to have a polygonal shape, and the vibration-preventing member may include a connection hollow configured to have a size and shape corresponding to the insertion portion of the connection shaft.

A cross section of the insertion portion of the connection shaft may be formed in a cross shape.

The vibration-preventing member may include silicone.

The slip-preventing portion may be disposed to form a gap with the insertion portion of the connection shaft.

The vibration-preventing member may include a material having elasticity.

The driving source may include a step motor.

The power transmission device may include a pinion gear connected to the vibration-preventing member, and a rack gear engaged with the pinion gear and connected to the panel.

Another aspect of the present disclosure provides a home appliance including a main body, a panel configured to be movable with respect to the main body, a rack gear connected to the panel and extending along a moving direction of the panel, a pinion gear engaged with the rack gear and having an insertion hollow therein, a vibration-preventing member inserted into the insertion hollow of the pinion gear and comprising a vibration-preventing portion in contact with an inner surface of the insertion hollow and a slip-preventing portion disposed to form a gap with the inner surface of the insertion hollow, and a driving source connected to the vibration-preventing member.

The slip-preventing portion may be configured to have a thickness thinner than the vibration-preventing portion.

A first portion of the insertion hollow into which the slip-preventing portion is inserted may be configured to interfere with rotation of the slip-preventing portion.

The first portion of the insertion hollow may be configured to have a size larger than the slip-preventing portion.

A second portion of the insertion hollow into which the vibration-preventing portion is inserted may be configured to correspond to a size and shape of the vibration-preventing portion.

The driving source may include a step motor.

The vibration-preventing member may include a material having elasticity.

According to an embodiment of the present disclosure, an air cleaner or a home appliance can reduce noise generated by vibration occurring in a driving source as a vibration-preventing member is provided between the driving source and a gear assembly.

According to an embodiment of the present disclosure, the air cleaner or the home appliance can prevent vibration occurring in the driving source from being transmitted to the gear assembly by forming the vibration-preventing member to have a step, and at the same time, prevent the vibration-preventing member from slipping and running idle with respect to the gear assembly.

DETAILED DESCRIPTION

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application. represent parts or components that perform substantially the same functions.

The terms used herein are for the purpose of describing the embodiments and are not intended to restrict and/or to limit the present disclosure. For example, the singular expressions herein may include plural expressions, unless the context dearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front side," "rear side," "upper portion," "lower portion," "left side" and "right side" used in the following description are defined with reference to the drawings, and the shape and position of each component are not limited by these terms.

Hereinafter, for convenience of explanation, an air cleaner will be described as an example, but a configuration for reducing vibration occurring in a driving device for driving a panel according to an embodiment of the present disclosure is not limited to the air cleaner. For example, the present invention may be applied to a home appliance having a movable panel such as a humidifier, a dehumidifier, and an air conditioner.

Hereinafter, embodiments of the present disclosure will be described in detail with reference to the accompanying drawings.

Figure 1:
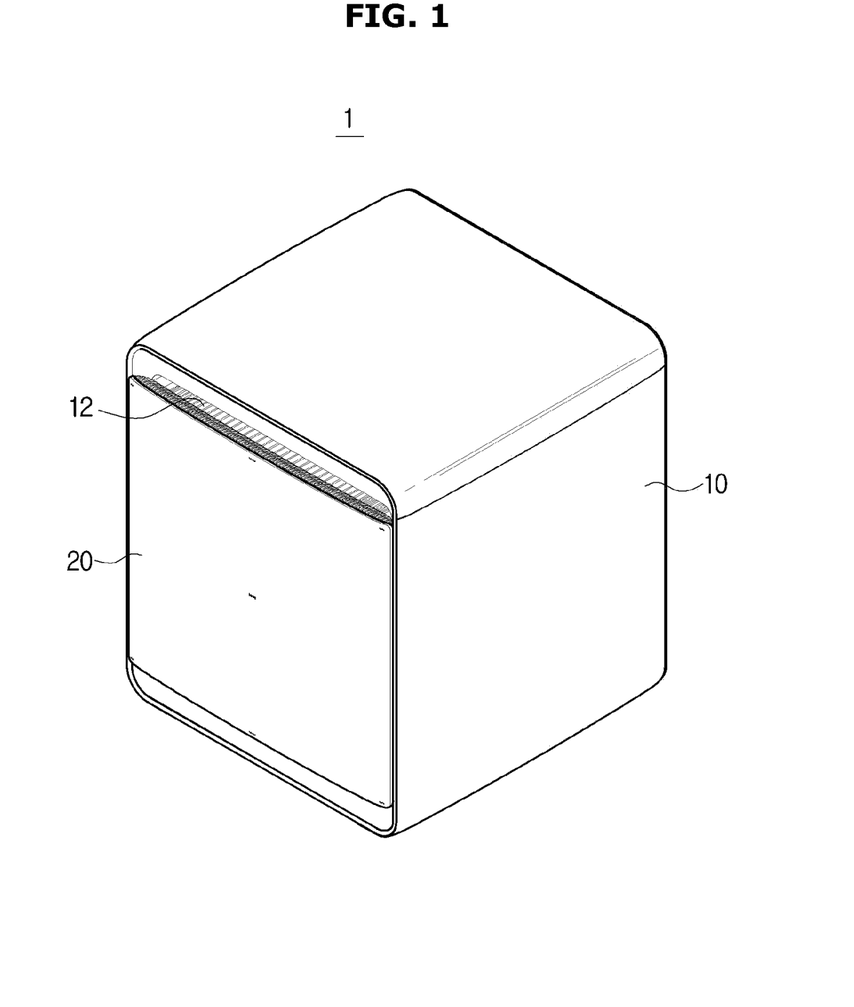
FIG. 1 illustrates an air cleaner according to an embodiment of the present disclosure.
Figure 2:
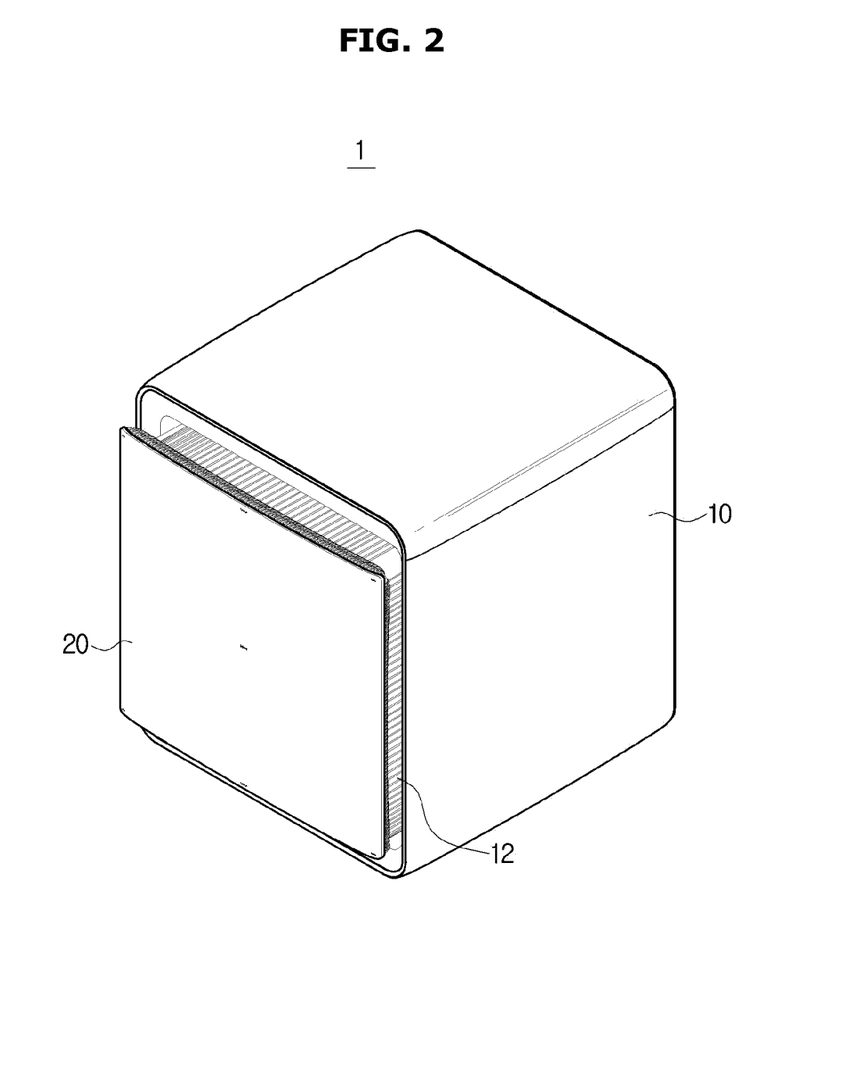
FIG. 2 illustrates a state in which a panel of the air cleaner illustrated in FIG. 1 increases a size of a discharge port.

FIG. 1 illustrates an air cleaner according to an embodiment of the present disclosure. FIG. 2 illustrates a state in which a panel of the air cleaner illustrated in FIG. 1 increases a size of a discharge port.

Referring to FIGS. 1 and 2, an air cleaner 1 according to an embodiment of the present disclosure may include a box-shaped main body 10 forming an outer appearance.

The air cleaner 1 may include a suction port (not shown) formed in the main body 10 such that air is sucked, and a discharge port 12 formed in the main body 10 such that the air sucked through the suction port is discharged. The suction port and the discharge port 12 may be formed on different surfaces, or may be formed on the same surface. The suction port may be formed on a rear surface of the main body 10. The discharge port 12 may be formed on a front surface of the main body 10.

A filter unit (not shown) and a blowing fan unit (not shown) may be disposed inside the main body 10. The blowing fan unit may suck outside air into the main body 10 through the suction port, pass through the filter unit to filter out contaminants, and then discharge the filtered air to the outside of the main body 10 through the discharge port 12. The filter unit may purify air sucked from the suction port, and may be installed detachably on the main body 10.

The air cleaner 1 may be configured such that a panel 20 is movable with respect to the main body 10 to increase a size of the discharge port 12. Specifically, as illustrated in FIG. 2, when the air cleaner 1 is operated, the panel 20 may move forward by a predetermined length to increase the size of the discharge port 12. On the other hand, as illustrated in FIG. 1, when the air cleaner 1 is not operated, the panel 20 may move rearward by a predetermined length to decrease the size of the discharge port 12.

Figure 3:
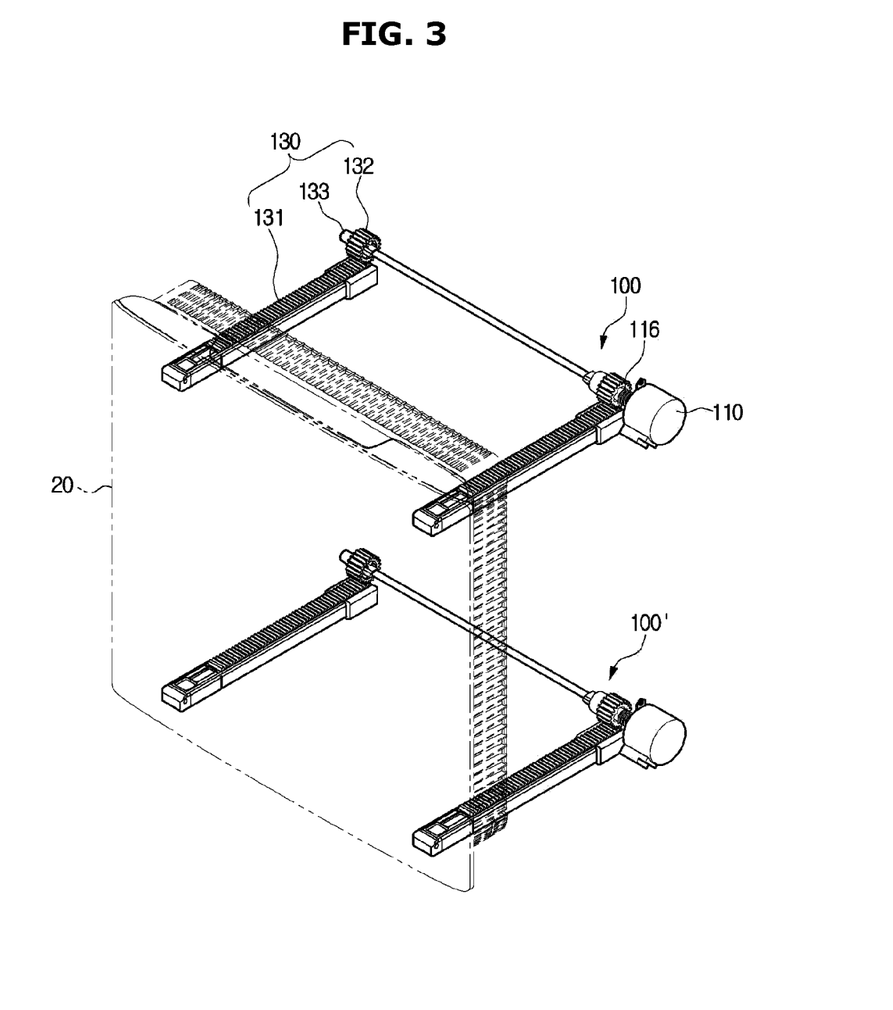
FIG. 3 illustrates driving devices for driving the panel of the air cleaner illustrated in FIG. 1.
Figure 4:
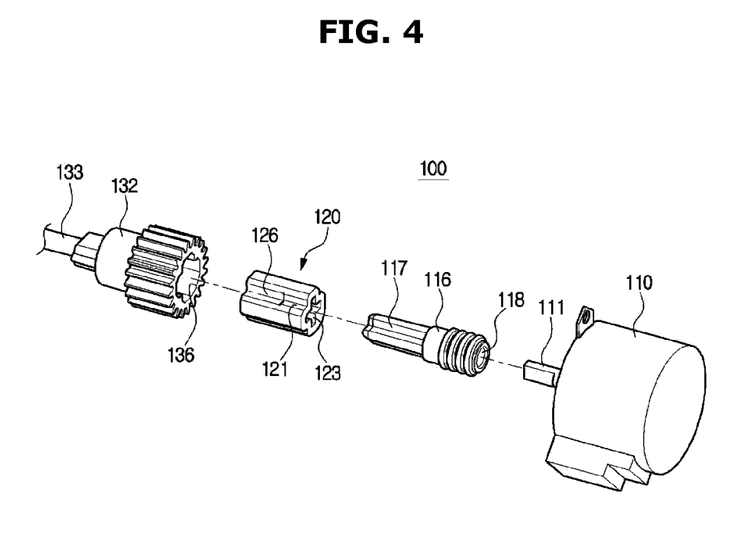
FIG. 4 is an exploded perspective view of the driving device illustrated in FIG. 3.
Figure 5:
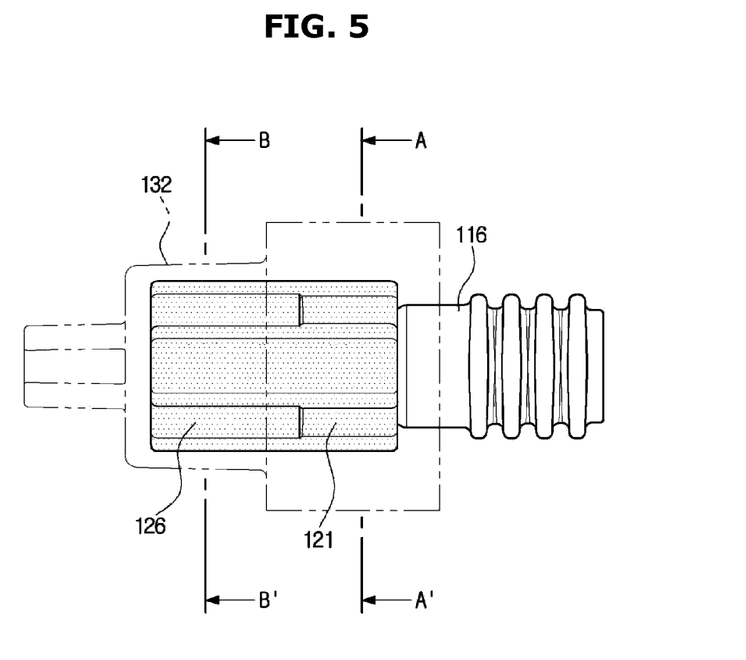
FIG. 5 illustrates a state in which a vibration-preventing member illustrated in FIG. 4 is coupled to a pinion gear and a connection shaft.
Figure 6:
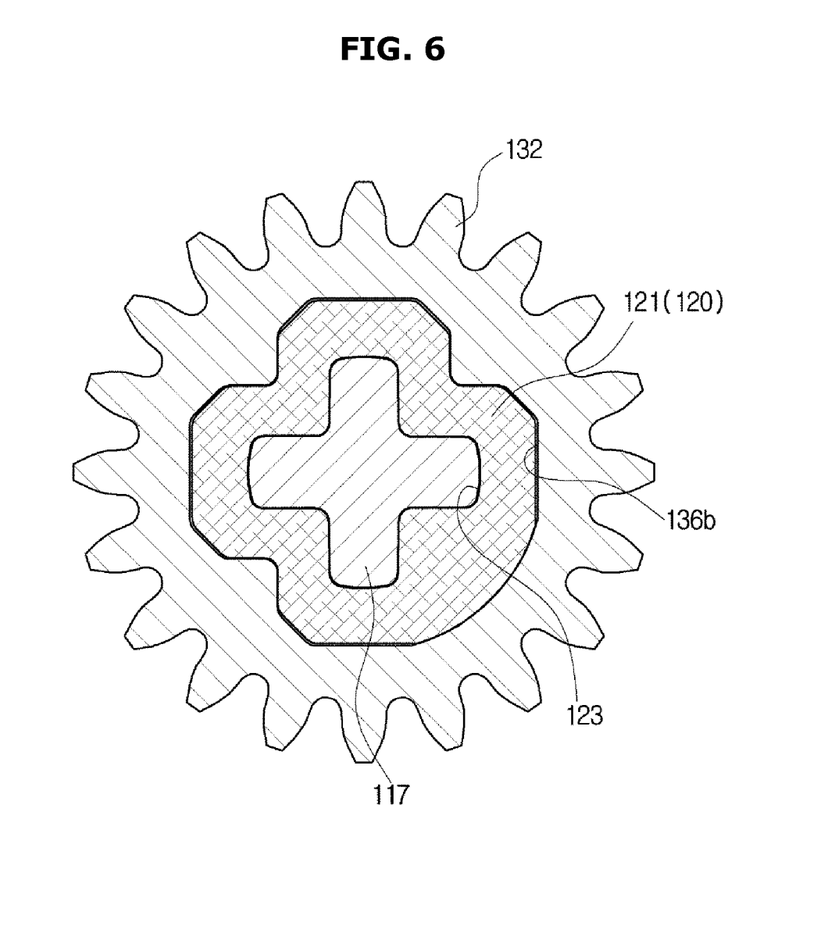
FIG. 6 is a cross-sectional view taken along line A-A' in FIG. 5.
Figure 7:
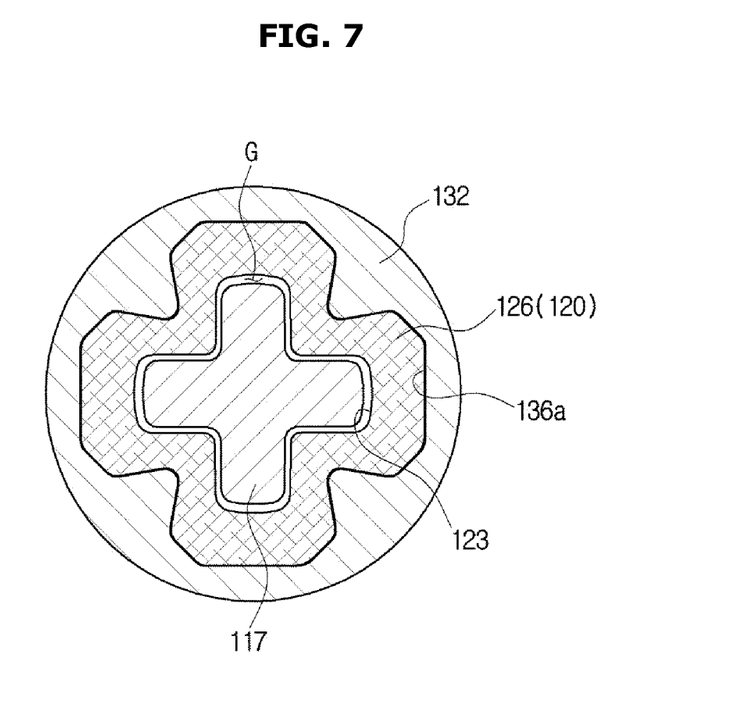
FIG. 7 is a cross-sectional view taken along line B-B' in FIG. 5.

FIG. 3 illustrates driving devices for driving the panel of the air cleaner illustrated in FIG. 1. FIG. 4 is an exploded perspective view of the driving device illustrated in FIG. 3. FIG. 5 illustrates a state in which a vibration-preventing member illustrated in FIG. 4 is coupled to a pinion gear and a connection shaft. FIG. 6 is a cross-sectional view taken along line A-A' in FIG. 5. FIG. 7 is a cross-sectional view taken along line B-B' in FIG. 5.

Referring to FIG. 3, the air cleaner 1 may include driving devices 100 and 100' to drive the panel 20. The driving devices 100 and 100' may include the first driving devices 100 connected to an upper portion of the panel 20 to move the panel 20 in the front-rear direction, and the second driving device 100' connected to a lower portion of the panel 20 to move the panel 20 in the front-rear direction. Alternatively, the driving devices may be provided to support the left and right sides of the panel, respectively, to move the panel 20. Because the first driving device 100 and the second driving device 100' have the same configuration, hereinafter, for convenience, only the first driving device 100 will be described, and the first driving device 100 will be referred to as the driving device 100.

The driving device 100 may include a driving source 110. The driving source 110 may generate power to drive the panel 20. The driving source 110 may include a step motor. FIG. 3 illustrates that the driving source 110 is disposed only on one side of a shaft 133 to provide power, but is not limited thereto, and the driving sources may be disposed on opposite sides of the shaft 133 to provide power. The driving source 110 may be connected to a vibration-preventing member 120 through a connection shaft 116.

Referring to FIG. 4, the driving source 110 may include a driving shaft 111 connected to the connection shaft 116 to transmit power to the connection shaft 116. The driving shaft 111 may have a polygonal cross section. The driving shaft 111 may have a cylindrical shape with one portion cut along a length direction. Accordingly, the driving shaft 111 may transmit power to the connection shaft 116 without slip. The driving shaft 111 may be inserted into a shaft hollow 118 of the connection shaft 116. The shaft hollow 118 may be formed to correspond to a shape and size of the driving shaft 111.

The driving device 100 may include the connection shaft 116. The connection shaft 116 is connected to the driving source 110 to transmit power generated from the driving source 110 to a power transmission device 130. To this end, the connection shaft 116 may include the shaft hollow 118 into which the driving shaft 111 of the driving source 110 is inserted. The connection shaft 116 may be formed with an injection material including acrylonitrile-butadiene-styrene (ABS).

The connection shaft 116 may include an insertion portion 117 connected to the vibration-preventing member 120. The insertion portion 117 may be provided such that a cross section perpendicular to a direction of being inserted into the vibration-preventing member 120 has a polygonal shape. The insertion portion 117 may be provided such that the cross section perpendicular to the direction of being inserted into the vibration-preventing member 120 has a substantially cross shape. Therefore, a connection hollow 123 may be provided to correspond to a shape and size of the insertion portion 117. The connection hollow 123 may be formed to be larger than the size of the insertion portion 117 by a predetermined size.

However, the driving device 100 may not include the connection shaft 116, and in this case, the driving shaft 111 of the driving source 110 may be directly inserted into and connected to the vibration-preventing member 120.

The air cleaner 1 may include the vibration-preventing member 120 connected to the connection shaft 116. The vibration-preventing member 120 may connect the connection shaft 116 to the power transmission device 130. Specifically, the vibration-preventing member 120 may connect the connection shaft 116 to a pinion gear 132 of the power transmission device 130. The vibration-preventing member 120 may reduce the transmission of vibration, which occurs in the driving source 110 and is transmitted to the connection shaft 116, to the power transmission device 130. The vibration-preventing member 120 may include a material having elasticity.

The vibration-preventing member 120 may be formed of rubber. The vibration-preventing member 120 may be composed of silicon, and may have a hardness of 40% or more and 70% or less. The vibration-preventing member 120 may be composed of silicon having a hardness of substantially 60%.

Referring to FIGS. 5 to 7, the vibration-preventing member 120 may include a vibration-preventing portion 121 in contact with the power transmission device 130, a slip-preventing portion 126 having a thickness thinner than the vibration-preventing portion 121, and the connection hollow 123.

Specifically, referring to FIGS. 5 and 6, the vibration-preventing portion 121 may be provided to correspond to a size and shape of a second portion 136b of an insertion hollow 136. The vibration-preventing portion 121 may be formed in a shape including a polygonal portion to transmit a rotational force of the driving source 110 to the power transmission device 130. The vibration-preventing portion 121 may be provided to be in contact with an inner surface of the second portion 136b of the insertion hollow 136. The vibration-preventing portion 121 may be fitted into the second portion 136b. The vibration-preventing portion 121 may be provided so as not to form a gap G with the second portion 136b. The vibration-preventing portion 121 may have a larger thickness than the slip-preventing portion 126. Accordingly, a larger deformation may occur in the vibration-preventing portion 121 than in the slip-preventing portion 126.

Referring to FIGS. 5 and 7, the vibration-preventing portion 121 may be disposed to form the gap G with the insertion portion 117 of the connection shaft 116. Because the slip-preventing portion 126 has a relatively thin thickness, even when the connection shaft 116 inserted into the connection hollow 123 attempts to rotate in the inside of the pinion gear 132 by a strong torque generated from the driving source 110, elastic deformation is relatively small, so that the connection shaft 116 may be prevented from running idle together with the vibration-preventing member 120.

Also, the slip-preventing portion 126 may have a polygonal cross section, and accordingly, a first portion 136a of the insertion hollow 136 may have a shape and/or size corresponding to the slip-preventing portion 126.

In the above, in order to prevent running idle due to slip of the connection shaft 116, it is illustrated that the gap G is formed between the slip-preventing portion 126 of the vibration-preventing member 120 having a relatively thin thickness and the insertion portion 117 of the connection shaft 116, but a gap may be formed between the slip-preventing portion 126 of the vibration-preventing member 120 and the insertion hollow 136 of the pinion gear 132. That is, the first portion 136a of the insertion hollow 136 may have a larger size than the slip-preventing portion 126.

According to this configuration, the vibration-preventing portion 121 of the vibration-preventing member 120 may reduce vibration transmitted from the driving source 110, and the slip-preventing portion 126 may prevent running idle due to slip of the driving source 110.

The air cleaner 1 may include the power transmission device 130 connected to the panel 20. The power transmission device 130 may move the panel 20 with respect to the main body 10 using power transmitted from the driving source 110. The power transmission device 130 may include a rack gear 131, the pinion gear 132, and the shaft 133.

One end of the rack gear 131 may be fixed to the panel 20. The rack gear 131 is connected to the panel 20 to guide the movement of the panel 20 in the front-rear direction. The rack gear 131 may receive a rotational force from the pinion gear 132 and move the panel 20 in the front-rear direction.

The pinion gear 132 may be engaged with the rack gear 131. The pinion gear 132 may transmit power transmitted through the connection shaft 116 and the vibration-preventing member 120 to the rack gear 131.

The pinion gear 132 may include the insertion hollow 136 into which the vibration-preventing member 120 is inserted. The insertion hollow 136 may include the first portion 136a into which the slip-preventing portion 126 of the vibration-preventing member 120 is inserted and the second portion 136b into which the vibration-preventing portion 121 is inserted. The pinion gear 132 may be connected to the shaft 133.

The rack gear 131 and the pinion gear 132 may be formed with an injection material including polyacetal (POM).

The first portion 136a may be formed to be in contact with the slip-preventing portion 126. The first portion 136a may be provided to prevent the connection shaft 116 and the slip-preventing portion 126 from slipping and running idle in the inside of the pinion gear 132 when a relatively strong torque is generated from the driving source 110. That is, the first portion 136a of the insertion hollow 136 may be formed to prevent the slip-preventing portion 126 from rotating in the inside of the insertion hollow 136. Specifically, even when the slip-preventing portion 126 is deformed by elasticity and attempts to rotate in the inside of the first portion 136a, the first portion 136a may be provided in a shape that may interfere with the rotation. Even when the slip-preventing portion 126 is greatly deformed as the insertion portion 117 of the connection shaft 116 is rotated by a strong torque being applied, an edge portion of the insertion portion 117 is interfered by a protruding portion of the first portion 136a of the insertion hollow 136 and may not be rotated.

The second portion 136b may be formed to be in contact with the vibration-preventing portion 121. The second portion 136b may be provided to correspond to a size and shape of the vibration-preventing portion 121.

One end of the shaft 133 may be connected to the pinion gear 132 adjacent to the driving source 110, and the other end thereof may be connected to the pinion gear 132 of the other side. That is, the shaft 133 is connected to the pinion gear 132 adjacent to the driving source 110 to receive power and may transmit the power to the pinion gear 132 distant from the driving source 110. Although not shown, the driving source may be provided to supply power to the respective pinion gears 132, and in this case, the shaft 133 may not be provided.

Figure 8:
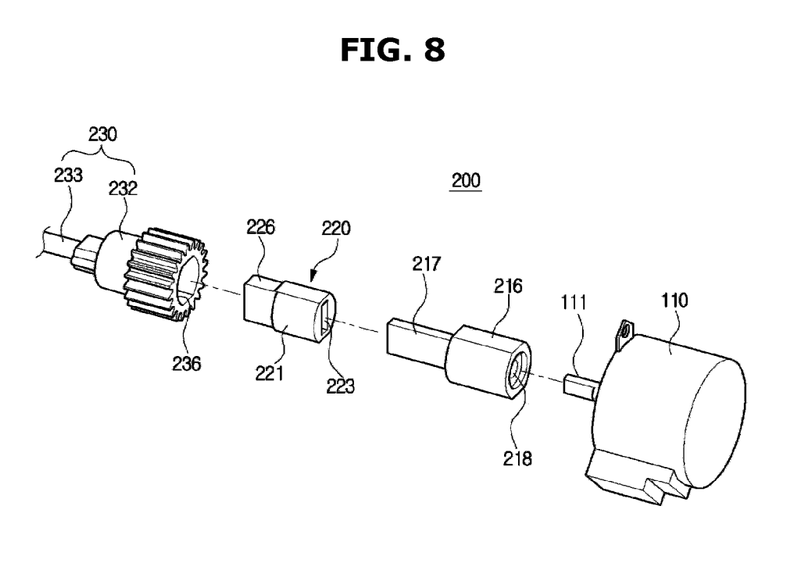
FIG. 8 is an exploded perspective view of a driving device according to another embodiment of the present disclosure.
Figure 9:
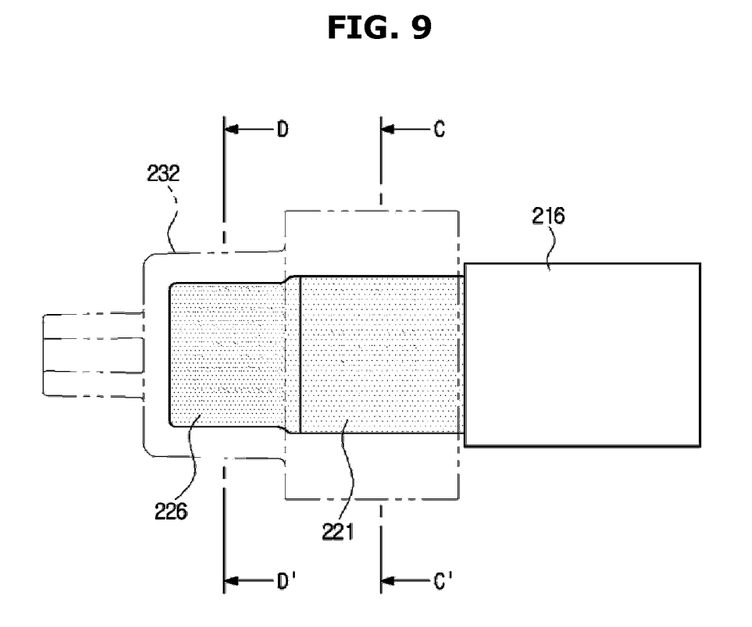
FIG. 9 illustrates a state in which a vibration-preventing member illustrated in FIG. 8 is coupled to a pinion gear and a connection shaft.
Figure 10:
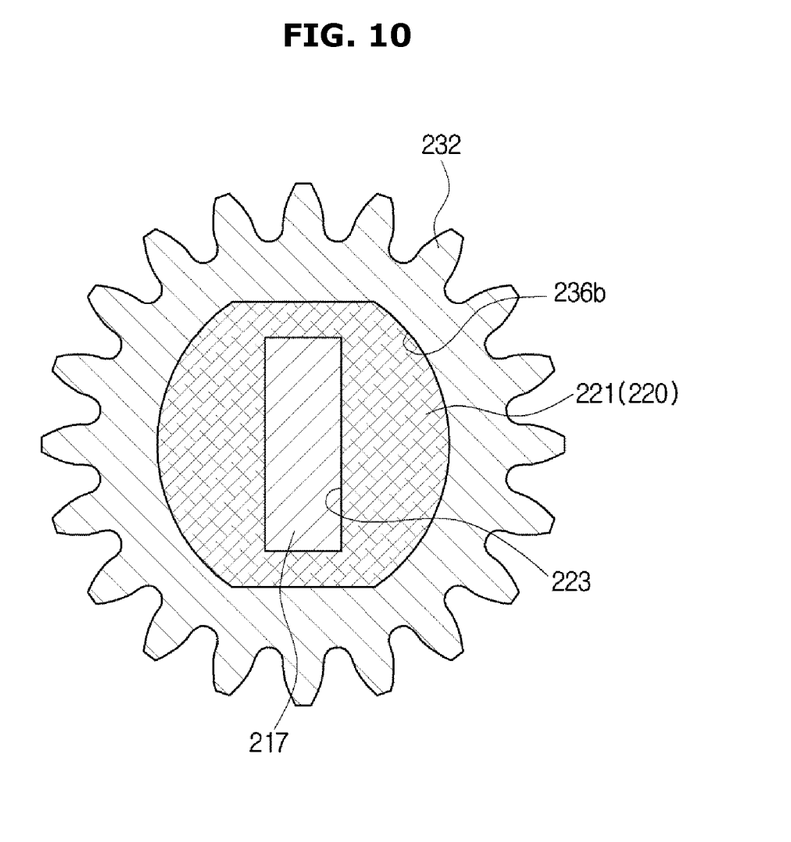
FIG. 10 is a cross-sectional view taken along line C-C' in FIG. 9.
Figure 11:
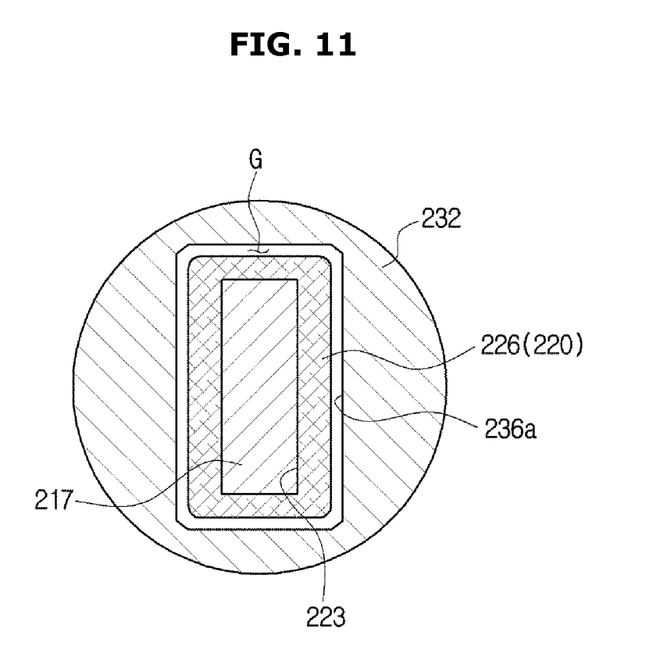
FIG. 11 is a cross-sectional view taken along line D-D' in FIG. 9.

FIG. 8 is an exploded perspective view of a driving device according to another embodiment of the present disclosure. FIG. 9 illustrates a state in which a vibration-preventing member illustrated in FIG. 8 is coupled to a pinion gear and a connection shaft. FIG. 10 is a cross-sectional view taken along line C-C' in FIG. 9. FIG. 11 is a cross-sectional view taken along line D-D' in FIG. 9.

A driving device 200 according to another embodiment of the present disclosure will be described with reference to FIGS. 8 and 11. However, the same reference numerals are assigned to the same components as in the above-described embodiment, and the description thereof may be omitted.

Referring to FIGS. 8 and 11, the driving device 200 according to another embodiment of the present disclosure may include the driving source 110, a connection shaft 216, a vibration-preventing member 220, and a power transmission device 230. Because the driving source 110 has the same configuration as the driving source 110 illustrated in FIGS. 3 to 7, a description thereof will be omitted. A shaft 233 may be connected to a pinion gear 232.

The connection shaft 216 may be connected to the driving source 110 to receive power from the driving source 110. To this end, the connection shaft 216 may include a shaft hollow 218 into which the driving shaft 111 of the driving source 110 is inserted.

The connection shaft 216 may include an insertion portion 217 inserted into the vibration-preventing member 220. Unlike the embodiment illustrated in FIGS. 3 to 7, the insertion portion 217 may have a rectangular cross section perpendicular to a direction of being inserted into the vibration-preventing member 220.

The vibration-preventing member 220 may include a connection hollow 223 into which the insertion portion 217 of the connection shaft 216 is inserted. The connection hollow 223 may be formed in a shape and size corresponding to the insertion portion 217 to receive a rotational force from the connection shaft 216.

The vibration-preventing member 220 may include a vibration-preventing portion 221 to reduce transmission of vibration occurring in the driving source 110 to the power transmission device 230, and a slip-preventing portion 226 to prevent the connection shaft 216 from slipping and running idle in the inside of the insertion hollow 236 of the pinion gear 232. The slip-preventing portion 226 may have a thickness thinner than the vibration-preventing portion 221.

The vibration-preventing portion 221 may be inserted into a second portion 236b of the insertion hollow 236 of the pinion gear 232. The vibration-preventing portion 221 may be fitted into the second portion 236b. The vibration-preventing portion 221 may be provided to correspond to a size and shape of the second portion 236b. The vibration-preventing portion 221 formed of an elastic material may reduce transmission of vibration occurring in the driving source 110 to the panel 20 as the vibration-preventing portion 221 comes into contact with the connection shaft 216 and the pinion gear 232.

The slip-preventing portion 226 may be provided to form the gap G with the pinion gear 232. The slip-preventing portion 226 may be in contact with the insertion portion 217 of the connection shaft 216. The slip-preventing portion 226 may have a cross section of a rectangular shape perpendicular to a direction of being inserted into the pinion gear 232.

According to this configuration, in the driving device 200 according to another embodiment of the present disclosure, the vibration-preventing portion 221 may reduce vibration transmitted from the driving source 110. Also, as the slip-preventing portion 226 having a relatively thin thickness is less deformed, even when the insertion portion 217 of the connection shaft 216 attempts to rotate in the inside of a first portion 236a of the insertion hollow 236, an edge portion of the slip-preventing portion 226 is interfered by an inner surface of the first portion 236a, so that the driving device 200 may prevent the connection shaft 216 from slipping and running idle in the inside of the pinion gear 232.

While the present disclosure has been particularly described with reference to exemplary embodiments, it should be understood by those of skilled in the art that various changes in form and details may be made without departing from the spirit and scope of the present disclosure.

The invention claimed is:
1. An air cleaner comprising:
a main body;
a panel configured to be movable with respect to the main body;
a power transmission device connected to the panel;
a vibration-preventing member connected to the power transmission device and comprising a vibration-preventing portion in contact with the power transmission device and a slip-preventing portion having a thickness thinner than the vibration-preventing portion; and a driving source comprises a connection shaft connected to the vibration-preventing member, the power transmission device comprises an insertion hollow into which the vibration-preventing member is inserted, the connection shaft comprise an insertion portion inserted into the vibration-preventing member, the slip-preventing portion is spaced apart from the power transmission device to form a gap with an inner surface of the insertion hollow, or is spaced apart from the connection shaft to form a gap with the insertion portion.

2. The air cleaner according to claim 1, wherein a first portion of the insertion hollow into which the slip-preventing portion is inserted is configured to interfere with rotation of the slip-preventing portion.

3. The air cleaner according to claim 2, wherein the slip-preventing portion is configured to have a polygonal shaped cross section, and the first portion of the insertion hollow is formed in a shape corresponding to the slip-preventing portion.

4. The air cleaner according to claim 2, wherein the first portion of the insertion hollow is configured to have a size larger than the slip-preventing portion.

5. The air cleaner according to claim 2, wherein a second portion of the insertion hollow into which the vibration-preventing portion is inserted is configured to correspond to a size and shape of the vibration-preventing portion.

6. The air cleaner according to claim 1, wherein the insertion portion is configured to have a polygonal shape, and the vibration-preventing member includes a connection hollow configured to have a size and shape corresponding to the insertion portion of the connection shaft.

7. The air cleaner according to claim 6, wherein a cross section of the insertion portion of the connection shaft is formed in a cross shape.

8. The air cleaner according to claim 1, wherein the vibration-preventing member comprises silicone.

9. The air cleaner according to claim 1, wherein the vibration-preventing member comprises a material having elasticity.

10. The air cleaner according to claim 1, wherein the driving source comprises a step motor.

11. The air cleaner according to claim 1, wherein the power transmission device comprises:

a pinion gear connected to the vibration-preventing member; and a rack gear engaged with the pinion gear and connected to the panel.

12. A home appliance comprising:

a main body;

a panel configured to be movable with respect to the main body;

a rack gear connected to the panel and extending along a moving direction of the panel;

a pinion gear engaged with the rack gear and having an insertion hollow therein;

a vibration-preventing member inserted into the insertion hollow of the pinion gear and comprising a vibration-preventing portion in contact with an inner surface of the insertion hollow and a slip-preventing portion is spaced apart from the pinion gear to form a gap with the inner surface of the insertion hollow; and a driving source comprises a connection shaft connected to the vibration-preventing member, the connection shaft comprise an insertion portion inserted into the vibration-preventing member, the slip-preventing portion is spaced apart from the connection shaft to form a gap with the insertion portion.

13. The home appliance according to claim 12, wherein the slip-preventing portion is configured to have a thickness thinner than the vibration-preventing portion.

* * * * *